(12) United States Patent
Singh

(10) Patent No.: US 11,043,312 B2
(45) Date of Patent: Jun. 22, 2021

(54) MULTI-COMPONENT CASK FOR STORAGE AND TRANSPORT OF SPENT NUCLEAR FUEL

(71) Applicant: Holtec International, Camden, NJ (US)

(72) Inventor: Krishna P. Singh, Hobe Sound, FL (US)

(73) Assignee: HOLTEC INTERNATIONAL

( * ) Notice: Subject to any disclaimer, the term of this patent is extended or adjusted under 35 U.S.C. 154(b) by 59 days.

(21) Appl. No.: 16/434,620

(22) Filed: Jun. 7, 2019

(65) Prior Publication Data
US 2020/0027612 A1   Jan. 23, 2020

Related U.S. Application Data

(60) Provisional application No. 62/681,731, filed on Jun. 7, 2018.

(51) Int. Cl.
| | | |
|---|---|---|
| *G21F 5/10* | (2006.01) | |
| *B65D 25/22* | (2006.01) | |
| *G21F 5/008* | (2006.01) | |
| *G21F 5/12* | (2006.01) | |
| *G21F 5/14* | (2006.01) | |

(52) U.S. Cl.
CPC ............... *G21F 5/10* (2013.01); *B65D 25/22* (2013.01); *G21F 5/008* (2013.01); *G21F 5/12* (2013.01); *G21F 5/14* (2013.01)

(58) Field of Classification Search
CPC ... G21F 5/10; G21F 5/008; G21F 5/12; G21F 5/14; B65D 25/22

USPC .......... 250/505.1, 506.1, 507.1, 517.1, 518.1
See application file for complete search history.

(56) References Cited

U.S. PATENT DOCUMENTS

| | | | |
|---|---|---|---|
| 4,825,088 A | 4/1989 | Nair et al. | |
| 4,862,007 A | 8/1989 | Mallory | |
| 4,893,022 A | 1/1990 | Hall et al. | |
| 5,061,858 A | 10/1991 | Mallory | |
| 6,252,923 B1 * | 6/2001 | Iacovino | G21F 5/06 |
| | | | 376/272 |

(Continued)

OTHER PUBLICATIONS

International Search Report and Written Opinion for International Application No. PCT/US2019/036019 dated Aug. 27, 2019.

*Primary Examiner* — Michael Maskell
(74) *Attorney, Agent, or Firm* — The Belles Group, P.C.

(57) ABSTRACT

A separable multi-component cask for spent nuclear fuel transport and storage includes a vertically elongated outer cylinder having a neutron radiation shielding composition and a vertically elongated inner cylinder having a gamma radiation blocking composition. The inner cylinder includes a cavity configured to hold a spent nuclear fuel canister. The inner cylinder is detachably mounted and nested inside a cavity of the outer cylinder and is separable therefrom during spent fuel cask loading operations in a staged manner. An air ventilation annulus formed between the first and second cylinders forms a heat removal passage to remove heat emitted by the radioactive canister when placed inside the second cylinder. A pair of removably coupled mating top flanges on the inner and outer cylinders supports and suspends the inner cylinder in a cantilevered manner, thereby allowing the directly heated inner cylinder to thermally expand to a greater degree than the outer cylinder.

23 Claims, 14 Drawing Sheets

(56) References Cited

U.S. PATENT DOCUMENTS

| | | | | |
|---|---|---|---|---|
| 7,893,414 | B2* | 2/2011 | Larsen | H01L 23/556 |
| | | | | 250/515.1 |
| 9,208,914 | B2* | 12/2015 | Singh | G21F 5/10 |
| 9,275,768 | B2 | 3/2016 | Wegeler et al. | |
| 9,640,289 | B2* | 5/2017 | Springman | G21F 5/06 |
| 9,831,006 | B2 | 11/2017 | Minor et al. | |
| 10,446,285 | B2* | 10/2019 | Singh | G21C 19/32 |
| 2006/0219960 | A1* | 10/2006 | Shimojo | G21F 5/008 |
| | | | | 250/518.1 |
| 2008/0265182 | A1* | 10/2008 | Singh | G21F 5/005 |
| | | | | 250/506.1 |
| 2010/0230619 | A1* | 9/2010 | Tamaki | G21F 9/36 |
| | | | | 250/506.1 |
| 2015/0092904 | A1* | 4/2015 | Carver | G21F 5/06 |
| | | | | 376/272 |
| 2016/0019991 | A1* | 1/2016 | Dederer | G21F 5/008 |
| | | | | 376/272 |

* cited by examiner

MULTI-COMPONENT CASK FOR STORAGE AND TRANSPORT OF SPENT NUCLEAR FUEL

CROSS-REFERENCE TO RELATED APPLICATIONS

This application claims the benefit of U.S. Provisional Application No. 62/681,731 filed Jun. 7, 2018, which is incorporated herein by reference in its entirety.

BACKGROUND

The present invention relates generally to casks used to transport and store spent nuclear fuel created by nuclear generating plants or other facilities.

In the operation of nuclear reactors, the nuclear energy source is in the form of hollow zircaloy tubes filled with enriched uranium, collectively arranged in assemblages referred to as fuel assemblies. When the energy in the fuel assembly has been depleted to a certain predetermined level, the fuel assembly is removed from the nuclear reactor. The standard structure used to package used or spent fuel assemblies discharged from light water reactors for off-site shipment or on-site dry storage is known as the fuel basket. The fuel basket is essentially an assemblage of prismatic storage cells each of which is sized to store one fuel assembly that comprises a plurality of individual spent nuclear fuel rods. The fuel basket is arranged inside a metallic storage canister which is placed into a ventilated outer overpack or cask for safe transport or storage of the multiple spent fuel assemblies within the inner fuel basket.

The spent nuclear fuel ("SNF") in the fuel assemblies is still highly radioactive and produces considerable heat which must be dissipated, in addition to concomitantly emitting dangerous ionizing neutron and gamma photons (i.e. neutron and gamma radiation) requiring protective shielding. Thus, caution must be exercised when the fuel assemblies are handled, transported, packaged and stored. Neutron radiation may be effectively attenuated with metallic and polymeric shielding materials typically containing boron. These boron-containing materials however are not effective at attenuating and shielding gamma radiation emitted from the fuel baskets. Effective gamma radiation shielding requires very dense materials, such as lead or others.

A typical transfer cask features a main body designed to structurally protect the spent nuclear fuel stored in the fuel canister inside it. A common configuration consists of concentrically arranged steel shells filled with lead. Such a cask body made with high-density conductive materials has excellent heat conduction and gamma radiation shielding capabilities, but unfortunately possesses a relatively modest neutron capture capability. For capturing neutrons, a hydrogenous material is needed which is generally provided by a jacket filled with water or a solid resinous material integrally and permanently joined to the main cask body.

This traditional transfer cask design suffers from several drawbacks which makes it marginal or unsuitable for loading canisters with high decay heat generation rates (i.e., in excess of 40 kW), in locations where the crane capacity is less than what is typically needed to load such a heavy transfer cask with inserted canister, or where the facility's cask loading area dimensions or spatial constraints prevent the placement of a traditional large-sized high-capacity transfer cask.

Improvements in the traditional transfer cask design to extend the applicability and versatility of transfer casks which overcomes the foregoing crane capacity and spatial constraint situations noted above are desired.

BRIEF SUMMARY

The present application provides a unique multi-component transfer cask comprised of two detachably coupled and separable nested containers. The transfer cask according to the present disclosure primarily comprises an outer neutron shield container or cylinder (NSC) and inner gamma blocker container or cylinder (GBC) removably insertable into the NSC. Unlike traditional transfer casks in which the neutron shielding material may be permanently incorporated with the gamma blocking material in the cask body, the present two-component transfer cask system with non-permanently mounted and separable GBC allows the spent fuel canister cask loading operations to be staged in a particular manner which can be accomplished within limited spatial constraints of the cask loading area (e.g. spent fuel pool) and within limited crane lifting capacities in situations where applicable. Otherwise, the weight of the fuel canister must be reduced by inserted fewer spent fuel assemblies than the full storage capacity of the canister which is inefficient and costly as more canisters must be employed.

The main body of the inner GBC of the transfer cask has a gamma radiation blocking composition that is preferably comprised of high density and high thermal conductivity materials such as steel, lead, or copper to block gamma radiation which are effective at blocking gamma radiation and in combination to provide structural integrity to the cylinder. The shell of the GBC is thus constructed of materials having a higher thermal conductivity than the shell of the NSC whose role is to shield neutron radiation requiring generally different typically less dense materials with lower thermal conductivity properties for neutron shielding. The GBC main body has a cylindrical cavity which encloses and supports the nuclear spent fuel canister. The transfer cask has suitably sized flanges or other structural connections or elements to secure the NSC thereto. The GBC can be of non-cylindrical external profile in some embodiments to comport with the architecture of the cask loading area in the spent fuel pool where the GBC is staged for fuel loading. In one embodiment, the shell of the GBC has a cylindrical shape with circular transverse cross section.

The outer NSC of the transfer cask serves the function of attenuating and absorbing (i.e., shielding) the neutrons emitted by the used fuel inside the canister and GBC. The NSC therefore has a solid or liquid neutron radiation blocking composition which may contain boron for neutron moderation. While it may also provide supplemental gamma shielding, its primary function is to provide shielding of neutrons. The NSC is separated from the cask's GBC main body at such times where the NSC's weight may exceed the available nuclear facility crane's lifting capacity, or its size may restrict loading operations in the facility's cask loading area (i.e., spent fuel pool) due to spatial constraints. The water-filled fuel canister with spent fuel assembly therein may be loaded into the GBC while submerged in the fuel pool. At the earliest convenient opportunity, following removal of the GBC from the cask loading area (with canister therein), the GBC and NSC are mated. At the time of the GBC removal from the spent fuel pool, the water filled in the fuel canister provides the neutron shielding until placement of the GBC in the outer NSC. The lighter lift weight of GBC and loaded water-filled fuel canister (without the NSC) is advantageously within the allowable crane capacity. When the operations in the cask loading area of the spent fuel pool are complete, the GBC is set down and the NSC and GBC are mated and coupled together as further described herein. The transfer cask assembly, now comprising the GBC and NSC, has the requisite shielding for the spent nuclear fuel in the canister to commence with traditional canister closure and transfer operations. Preferably, the NSC is installed prior to the dewatering of the canister in the GBC to assure no lapse in neutron shielding. Prior to lifting the transfer cask, now including the GBC, canister, and NSC, the canister preferably has been dewatered to reduce its overall lift weight to within the capacity of the crane (or other lifting device such as the cask, vertical transporter vehicle). With the NSC in place, there is no longer a need for the neutron protection afforded by the water inside the canister.

The principal means of heat rejection in the two-piece transfer cask according to the present disclosure is the natural convective air flow ventilation action in a circumferentially and vertically extending air ventilation annulus formed between the GBC and NSC. The cooling air circulation is naturally driven and induced by the hot exterior surface of the GBC heated by decay heat emitting by the spent fuel assemblies in the canister located inside the GBC. The annulus extends for substantially the entire height of the cask having a bottom air inlet opening and top air outlet openings. The heat rejection may further be boosted and enhanced by providing an open and ventilated annular space inside the GBC at the canister-to-GBC interface for on-demand ventilation capacity. For optimal thermal and ALARA performance, the ability to keep this secondary inner annulus filled with water for additional neutron shielding when needed, or alternatively air ventilated at times for additional heat rejection is desirable during different stages of the spent fuel loading and transfer process.

This drainable canister-to-GBC annular space is also valuable if it is desired to cool the canister more efficiently by spraying of the canister lid with cooling water to remove excess heat in some situations. The spray may be gravity fed and flows over and around the canister through the annular space for maximum reliability to protect the structural integrity of the canister and fuel assemblies therein. Calculations show that the spray mode can keep the water in the water-filled canister from boiling for an indefinite period which is critically important to deal with the scenario where a fuel bearing canister must remain water filled for an extended period of time such as for neutron shielding.

The coupling arrangement between the separable NSC and GBC is unique and compensates for differential thermal expansion between these two cylinders. The inner GBC has a top mounting flange which is rigidly and detachably coupled to a top flange of the outer NSC such that the inner GBC is suspended and supported via the coupled flanges at the top in a cantilevered manner. In one preferred embodiment, there is no other rigid coupling engagement between the NSC and GBC below the coupled top flanges. Advantageously, this allows the hotter body of inner GBC (heated by decay nuclear fuel heat emitted from the canister inside the GBC) to thermally grow and expand vertically downwards in length from the coupled flanges to a greater degree than the relatively cooler outer NSC which is exposed to natural ambient cooling air. This avoids the formation of cracks between the GBC and NSC due to differential thermal expansion. In one embodiment, the two flanged may be bolted together by a plurality of threaded fasteners.

In one aspect, a separable multi-component cask for spent nuclear fuel transport and storage comprises: a vertical longitudinal axis; a vertically elongated first cylinder having a neutron radiation shielding composition, the first cylinder defining a first cavity extending along the longitudinal axis; a vertically elongated second cylinder having a gamma radiation blocking composition, the second cylinder defining a second cavity extending along the longitudinal axis and configured to hold a spent nuclear fuel canister; the second cylinder detachably mounted inside the first cavity of the first cylinder; and an air ventilation annulus formed between the first and second cylinders, the air ventilation annulus defining a heat removal passage to remove heat emitted by the canister when placed inside the second cylinder.

In one aspect, a multi-component transfer cask system for storage and transport of spent nuclear fuel comprises: a vertical longitudinal axis; a vertically elongated outer container having a neutron radiation shielding composition, the outer container comprising a top end including an annular top flange, a bottom end, and a cylindrical sidewall extending between the ends and defining a first cavity; a vertically elongated inner container having a gamma radiation blocking composition, the inner container comprising a top end including an annular mounting flange, a bottom end, and a sidewall extending between the ends and defining a second cavity configured to hold a spent nuclear fuel canister; the mounting flange of the inner container detachably coupled to the top flange of the outer the outer container such that the inner container is suspended and supported via the coupled flanges in a cantilevered manner; wherein the inner container is axially and slideably separable from the outer container. The suspended and cantilevered mounting of the inner container allows the container which is directly heated by a spent nuclear fuel canister when placed therein to grow at a higher differential thermal expansion rate than the cooler outer container, thereby avoiding thermal expansion cracking between the two containers.

In one aspect, a method for transferring and transporting spent nuclear fuel comprises: providing a nuclear fuel transport cask comprising an outer neutron shield cylinder having an internal first cavity and an inner gamma block cylinder having an internal second cavity, the gamma block cylinder detachably coupled to and nested inside the first cavity of the neutron shield cylinder; separating the gamma block cylinder from the neutron shield cylinder; placing the gamma block cylinder on a support surface; loading a plurality of spent nuclear fuel assembles into the second cavity of the gamma block cylinder; lifting the gamma block cylinder over the neutron shield cylinder; and inserting the gamma block cylinder and fuel canister assembly into the neutron shield cylinder.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein like elements are labeled similarly and in which.

Figure 1:
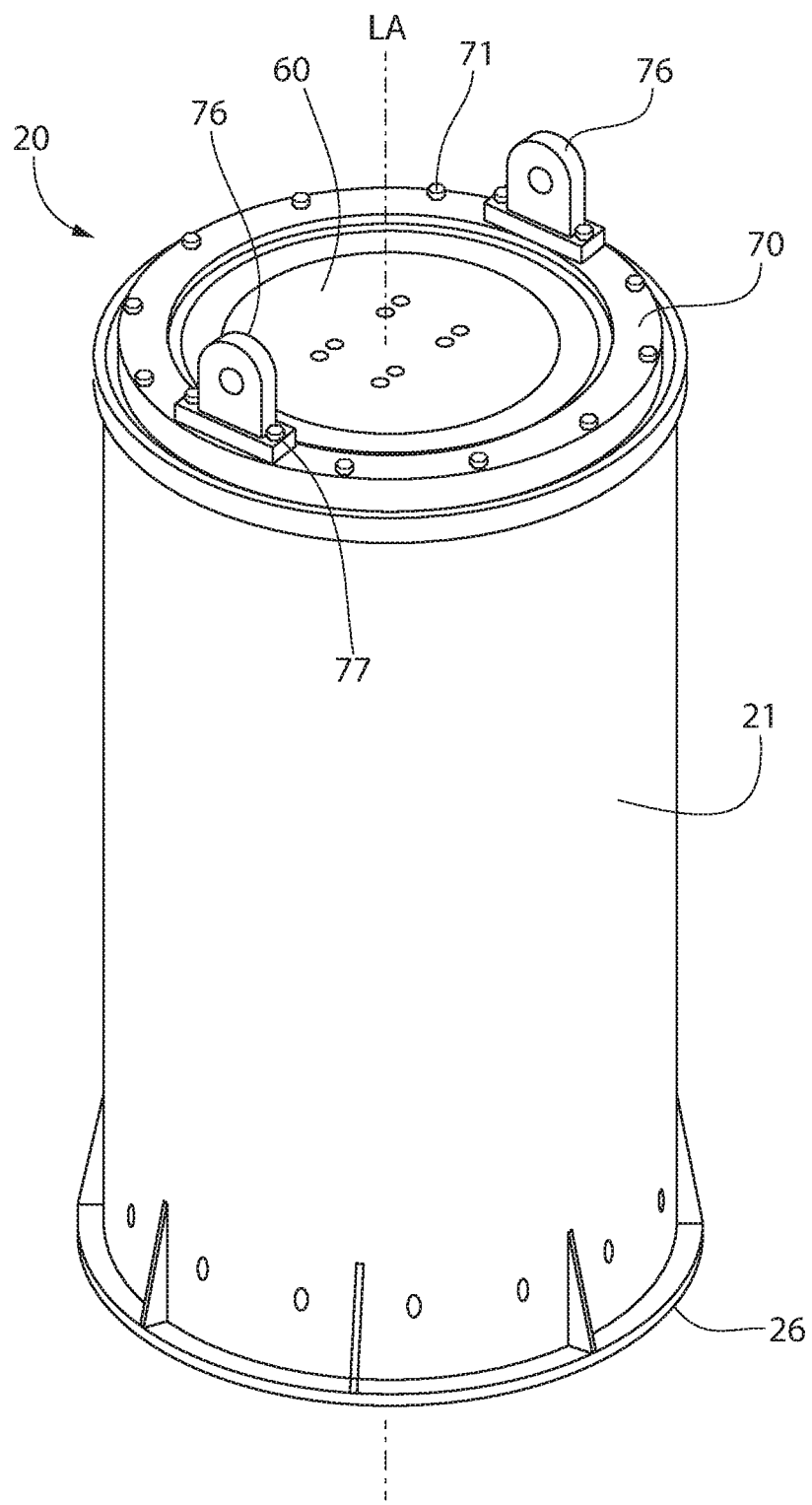
FIG. 1 is a perspective view of a multi-component transfer cask system for storage and transport of spent nuclear fuel according to the present disclosure.
Figure 2:
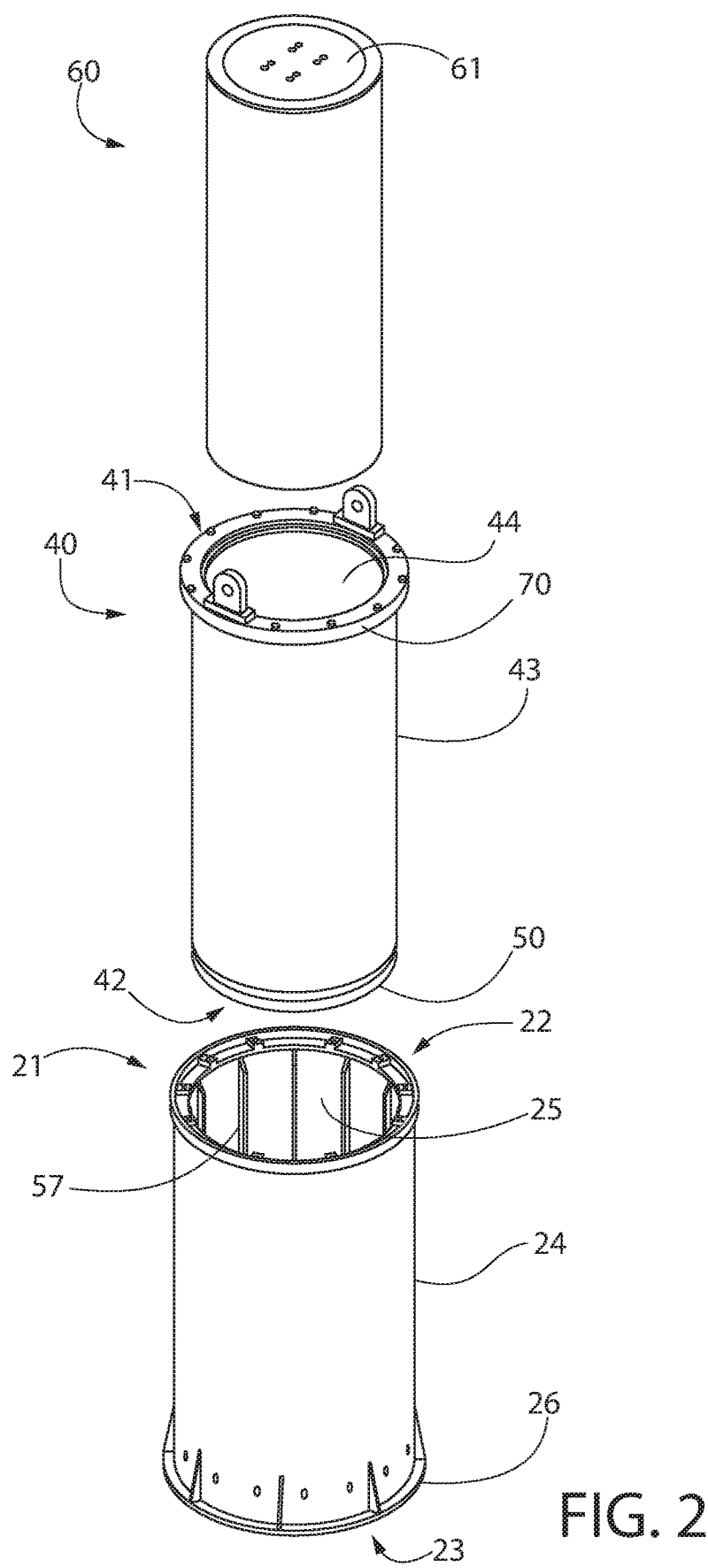
FIG. 2 is an exploded perspective view thereof.

All drawings are schematic and not necessarily to scale. Features shown numbered in certain figures are the same features which may appear un-numbered in other figures unless noted otherwise herein.

DETAILED DESCRIPTION

The features and benefits of the invention are illustrated and described herein by reference to exemplary embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

As used throughout, any ranges disclosed herein are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

FIGS. 1-13 depict a system for storing and transporting radioactive spent nuclear fuel comprising a cask 20. Cask 20 is vertically elongated defining a vertical longitudinal axis LA and includes outer neutron shield cylinder 21 (NSC) and inner gamma blocker cylinder 40 (GBC) detachably and removably positioned and inserted inside the outer cylinder. These cylinders may be variously referred to herein by their abbreviations/acronyms, full names, or simply inner and outer cylinders.

Outer NSC 21 has an elongated body including a top end 22, a bottom end 23, cylindrical sidewall 24 extending between the ends, and an internal cavity 25. Cavity 25 extends completely through the cylinder 21 along the longitudinal axis from the top to bottom end. Cylinder 21 includes an interior surface 30 and opposing exterior surface 30. NSC 21 may be comprised of a single long cylinder body, or alternatively may be formed by a plurality of axially aligned and vertically stacked cylinder segments seal welded together at the joints between the segments to collectively form the cylinder body The bottom end 23 of neutron shield cylinder 21 may include a gusseted annular radial bottom support flange 26 for support of the NSC and stiffening of the sidewall 24 of the cylinder. The flange 26 may extend radially/laterally completely from the interior surface 30 of cylinder to the outer exposed exterior surface 31 in one non-limiting embodiment (see, e.g. FIG. 7). The flange 26 is configured and arranged to engage a platform 73 surrounding a receptacle 74 of a self-propelled wheeled or tracked vertical cask transport vehicle or crawler 75 used to transport the fully loaded cask 20 with loaded fuel canister, GBC, and NSC (represented schematically in FIGS. 13 and 14). Such cask transporters are well known in the art and commercially available from manufacturers such as Enerpac Heavy Lifting Technology and others. When the inner gamma block cylinder 40 loaded with a fuel canister 60 is mounted inside the outer NSC 21, the bottom end of the GBC projects downwards below support flange 26 into the upwardly open receptacle 74 and may not engage any structural surface of the transport vehicle for support. Accordingly, the bottom support flange 26 of the outer NSC supports the entire weight of the cask 20 and spent fuel therein.

The top end 22 of the cylinder 21 may include an annular radial top flange 27 defining an upwardly open top recess 28. The flange 27 is configured to form a vertically-extending annular lip 27-1 extending circumferentially around the top end of the cylinder 21. In one embodiment, the flange 27 may be formed by an L-shaped metallic structural angle comprising a horizontal section 27-2 and adjoining vertical section which defines the annular lip 27-1 that defines a perimeter of the flange (see, e.g. FIG. 6). Both the top and bottom flanges 26 and 27 are rigidly coupled to the sidewall 24 of the neutron shield cylinder 21 such as via seal welding. Each flange 26, 27 may further protrude radially outward beyond the sidewall 24 of neutron shield cylinder 21 as shown in one non-limiting embodiment.

Figure 4:
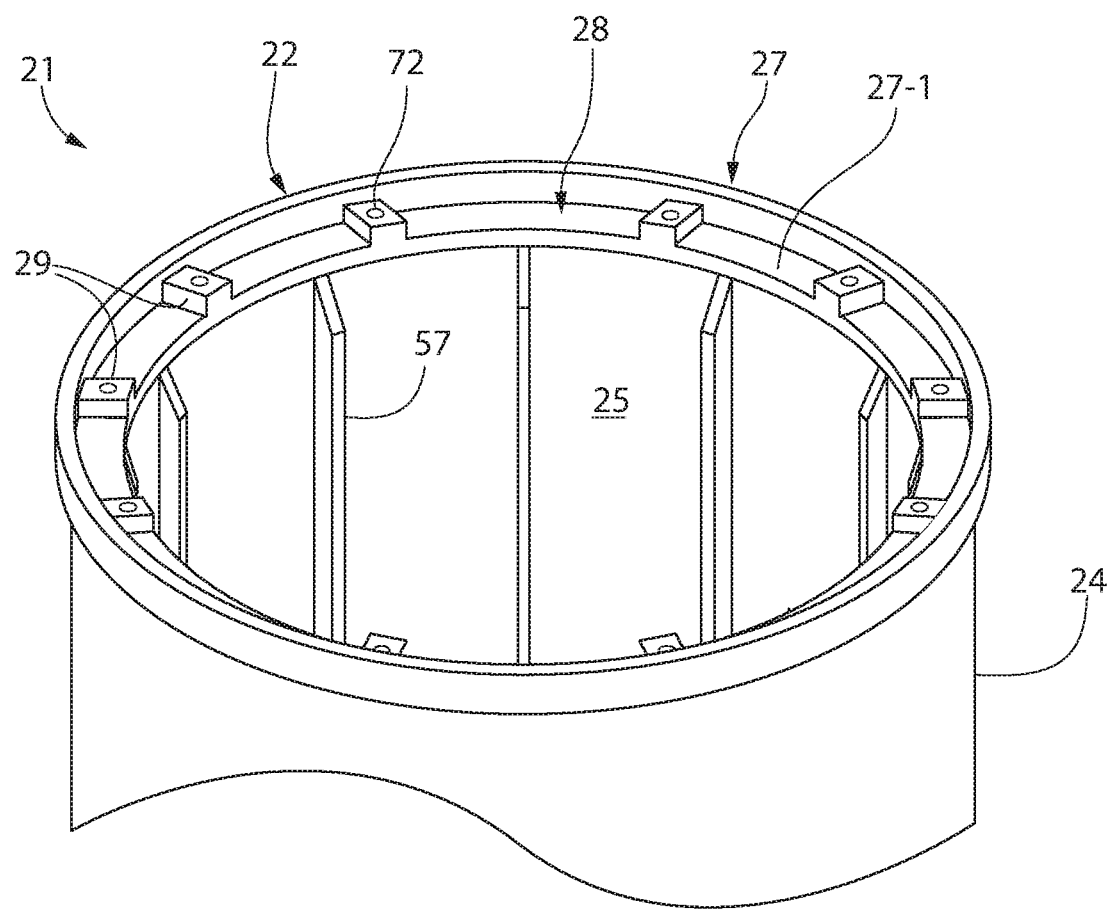
FIG. 4 is an enlarged top perspective view of the top of the neutron shield cylinder showing longitudinal guide splines and other features.

In one embodiment, the top end 22 of the outer neutron shield cylinder 21 may be castellated in configuration including a plurality of castellations formed by raised spacer blocks 29 disposed in the top recess 28 of the cylinder created by top mounting flange 27 (see, e.g. FIG. 4). The spacer blocks 29 extend vertically upwards from a planar upward facing surface 27-1 of the top flange 27. Spacer blocks 29 may be rectangular or square cuboid in shape. Blocks 29 may be circumferentially spaced apart on the top flange 27 at preferably regular intervals in one embodiment to uniformly engage the mounting flange 70 of the inner gamma blocking cylinder 40 and support the cylinder, as further described herein.

Figure 7:
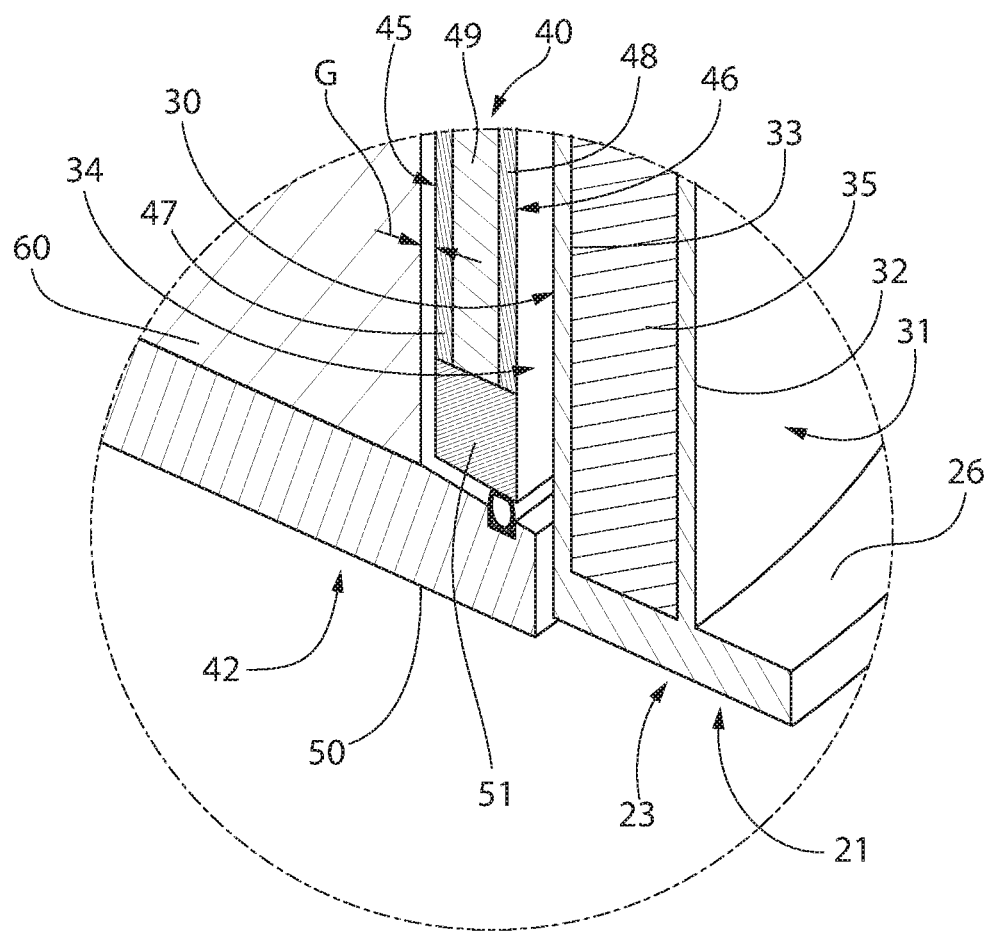
FIG. 7 is an enlarged bottom detail of the cask taken from FIG. 5.

In one embodiment, the neutron shield cylinder 21 may have a composite wall construction including an inner cylindrical shell 33 and outer cylindrical shell 32 with a neutron attenuation shielding media 35 sandwiched therebetween (best shown in FIG. 7). The shells may be formed of a suitable metal of sufficient structural strength and thickness such as without limitation stainless steel for corrosion protection. The neutron shielding media 35 may be a boron-containing material for neutron attenuation. In one embodiment, the neutron shielding may be a solid material such as Holtite™ available from Holtec International of Camden, N.J. which is formulation comprising hydrogen rich polymer impregnated with uniformly dispersed boron carbide particles. Other boron containing materials may be used. In other embodiments, the neutron shielding media 35 may be liquid such as water containing boric acid. In either the case of a solid or liquid neutron shielding media, the media may be completely enclosed or encased between the walls 32, 33 and the top and bottom flanges 27, 26 of cylinder 21 as shown.

The inner gamma blocking cylinder 40 will now be further described. Referring generally to FIGS. 1-13, the inner cylinder 40 has an elongated body including a top end 41, a bottom end 42, sidewall 43 extending between the ends, and an internal cavity 44. Sidewall 43 may be cylindrical with circular transverse cross section in some embodiments to match the cylindrical shape of the fuel canister 60. However, other non-cylindrical shaped sidewalls such as hexagonal or other for example.

Cavity 44 of gamma block cylinder 40 extends completely through the body of the cylinder 40 along the longitudinal axis LA from the top to bottom ends 41, 42. Cavity 44 is configured to hold and support the nuclear spent fuel canister 60 therein. The cavity 44 of the gamma block cylinder 40 preferably has a transverse cross-sectional area configured to hold no more than a single spent nuclear fuel canister 60, which in turn holds a plurality of spent fuel assemblies which each contain the fuel rods. Canister 60 includes a sealable lid 61 to provide access to the interior of the canister and fuel assemblies stored therein. A typical nuclear fuel canister may hold approximately 89 fuel assemblies at full capacity. The inner cylinder 40 further includes an interior surface 45 and opposing exterior surface 46. The gamma block cylinder 40 may be comprised of a single long cylinder body, or alternatively may be formed by a plurality of axially aligned and vertically stacked cylinder segments seal welded together at the joints between the segments to collectively form the cylinder body.

In one embodiment, the GBC 40 may have a composite wall construction including an inner cylindrical shell 47 and outer cylindrical shell 48 with a gamma blocking liner 49 interposed and sandwiched therebetween (best shown in FIG. 7). An annular bottom closure ring 51 may be provided to enclose and support the bottom ends of the two shells and liner. The shells 47, 48 may be formed of a suitable metal of sufficient structural strength and thickness such as without limitation stainless steel for corrosion protection. The gamma blocking liner 49 material is preferably constructed of a high density and high thermally conductive metallic material(s) selected and operable to block gamma radiation. Suitable materials which may be used that meet those criteria include steel, lead, or copper as some non-limiting examples. In one implementation, the composite wall construction may be steel/lead/steel—all of which serve to block gamma radiation emitted by the decaying nuclear fuel held inside the fuel canister 60 disposed in cavity 44 of the GBC.

Figure 5:
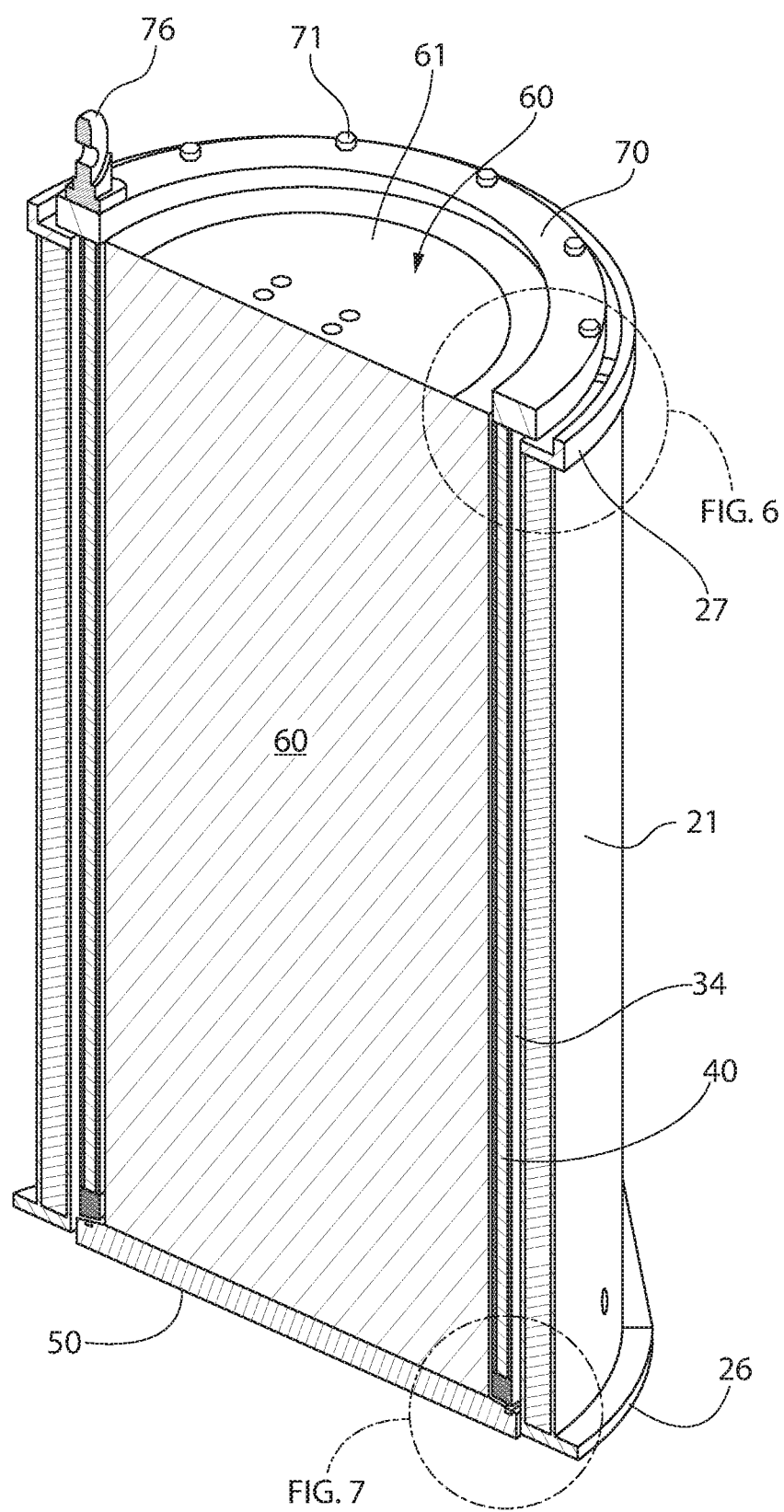
FIG. 5 is a side cross-sectional perspective view of the transfer cask.
Figure 8:
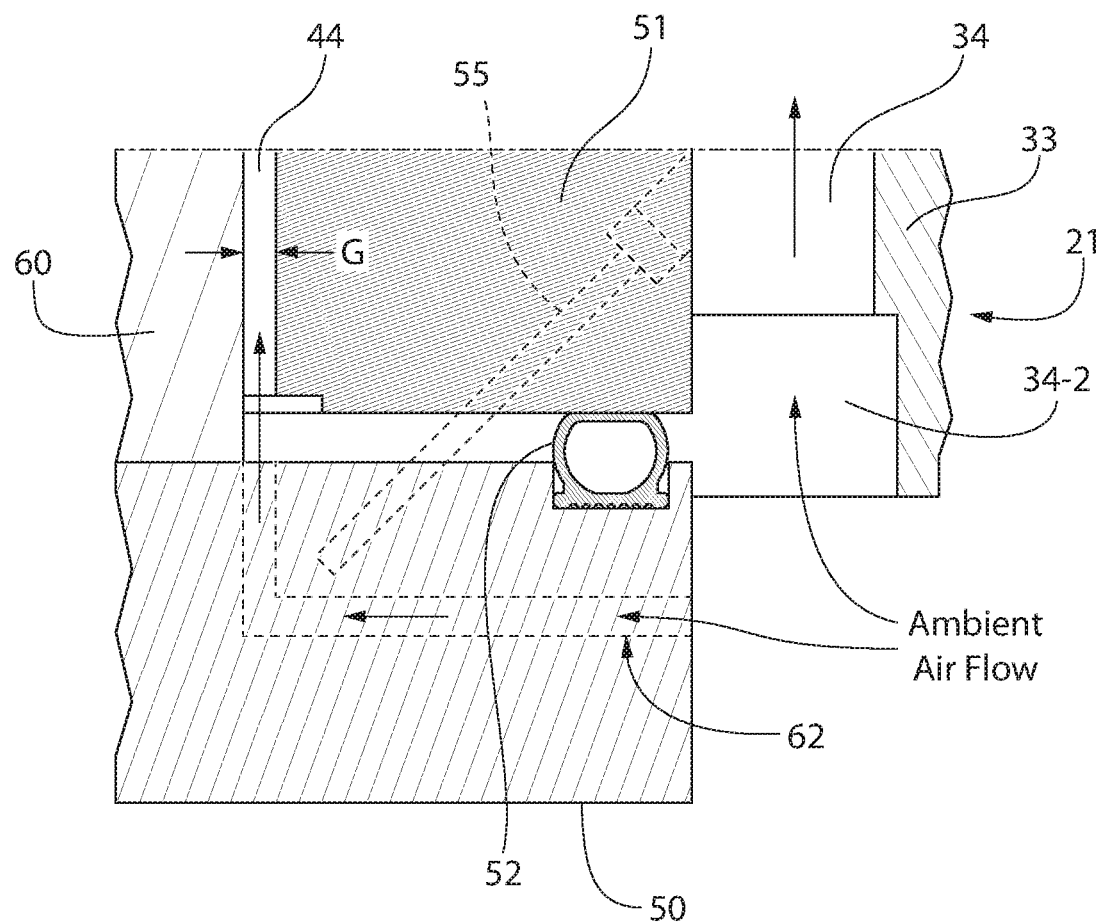
FIG. 8 is an enlarged side view detail of the bottom portion of the cask showing sealing and air flow patterns.

The cavity 44 at the bottom end 42 of GBC 40 may be closed by a detachable bottom lid 50 best shown in FIGS. 5, 7, and 8. Lid 50 protrudes vertically downwards below the bottom support flange 26 and bottom end 23 of the outer neutron shield cylinder 21 when the inner gamma block cylinder 40 is placed therein. The lid 50 is constructed to support the spent fuel canister 60 which rests on the planar horizontal top surface of lid, which is of suitable thickness for this purpose without undue deflection from the weight of the canister.

Figure 9:
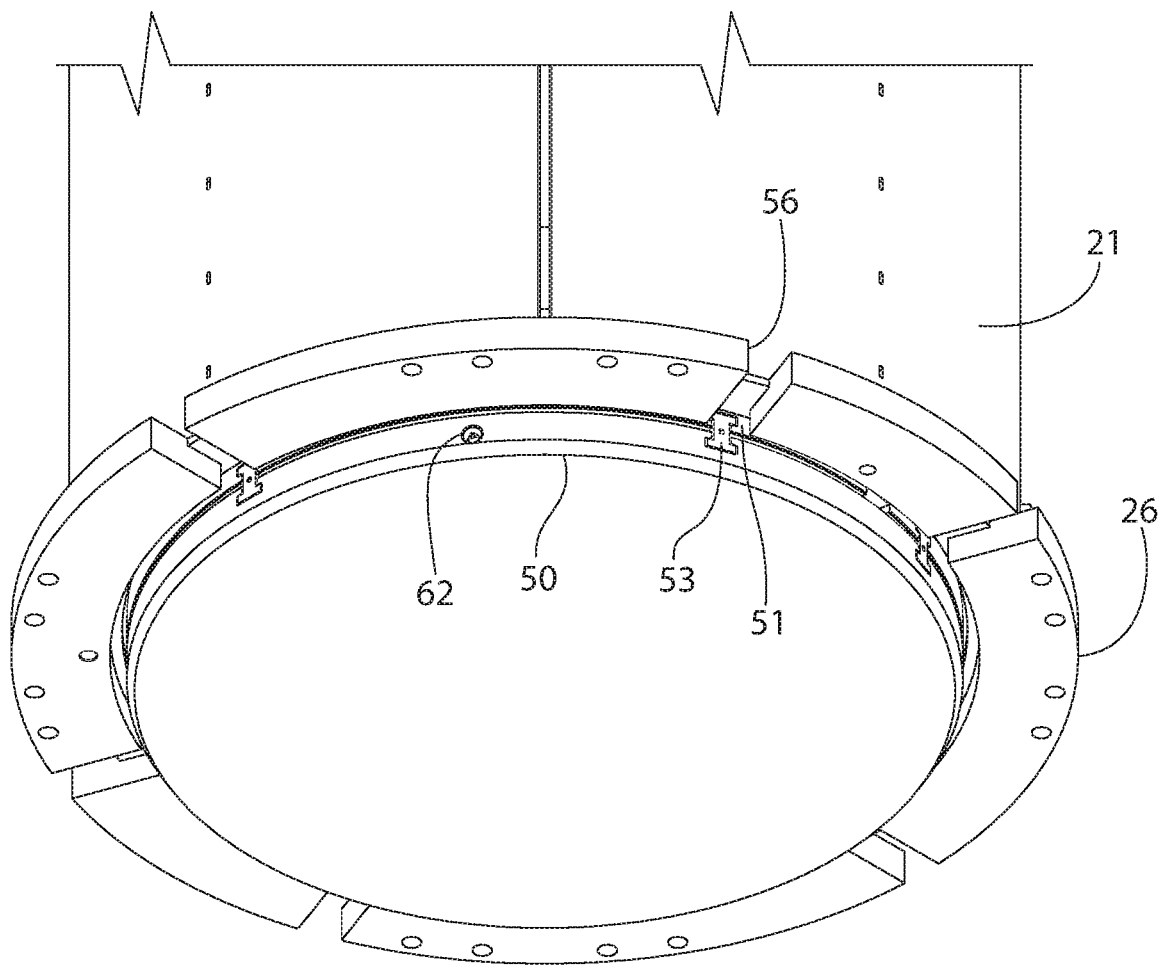
FIG. 9 is a bottom perspective view of the cask shown a mounting mechanism for attaching a bottom lid to the inner gamma block cylinder.
Figure 10:
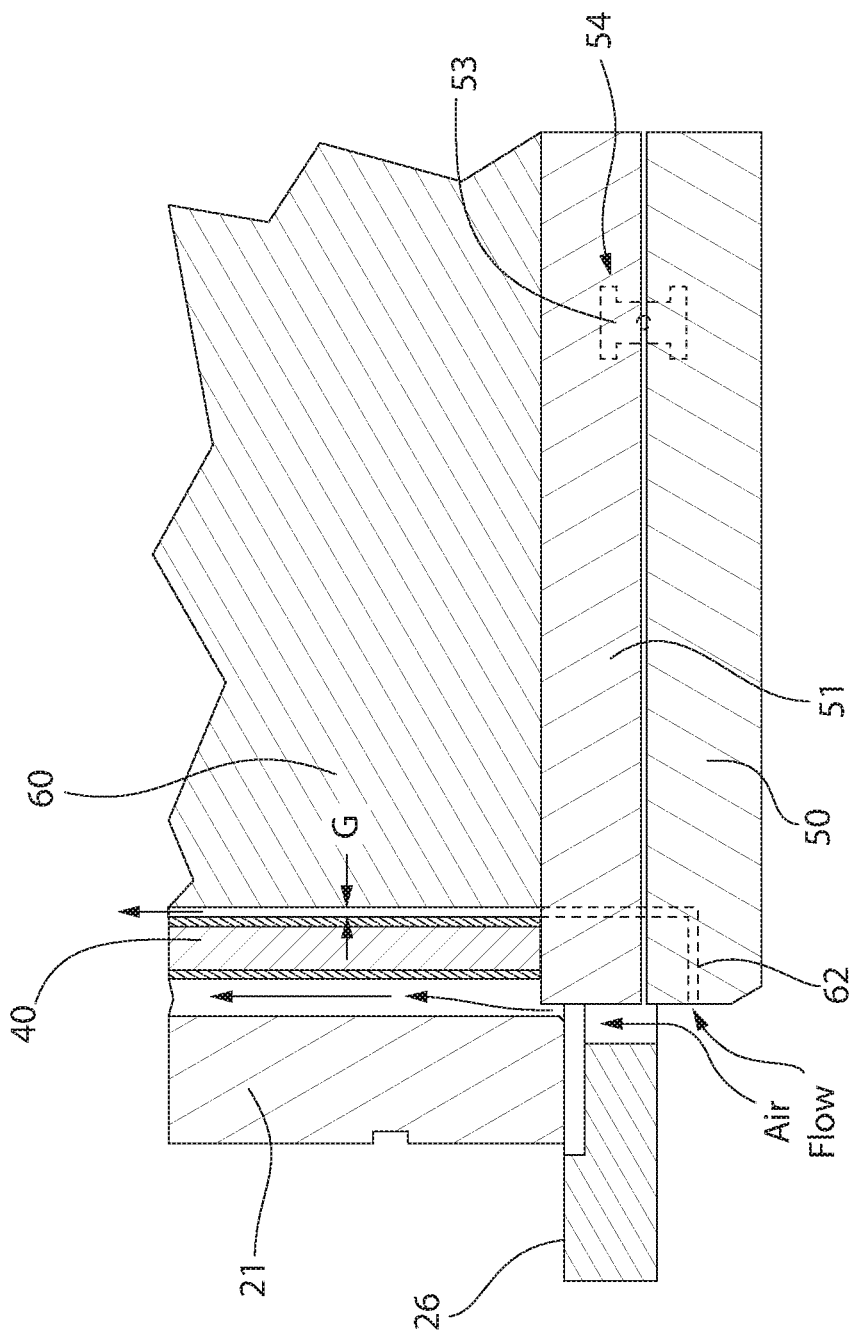
FIG. 10 is an enlarged detail of the bottom portion of the cask showing the mounting mechanism of FIG. 9.
Figure 11:
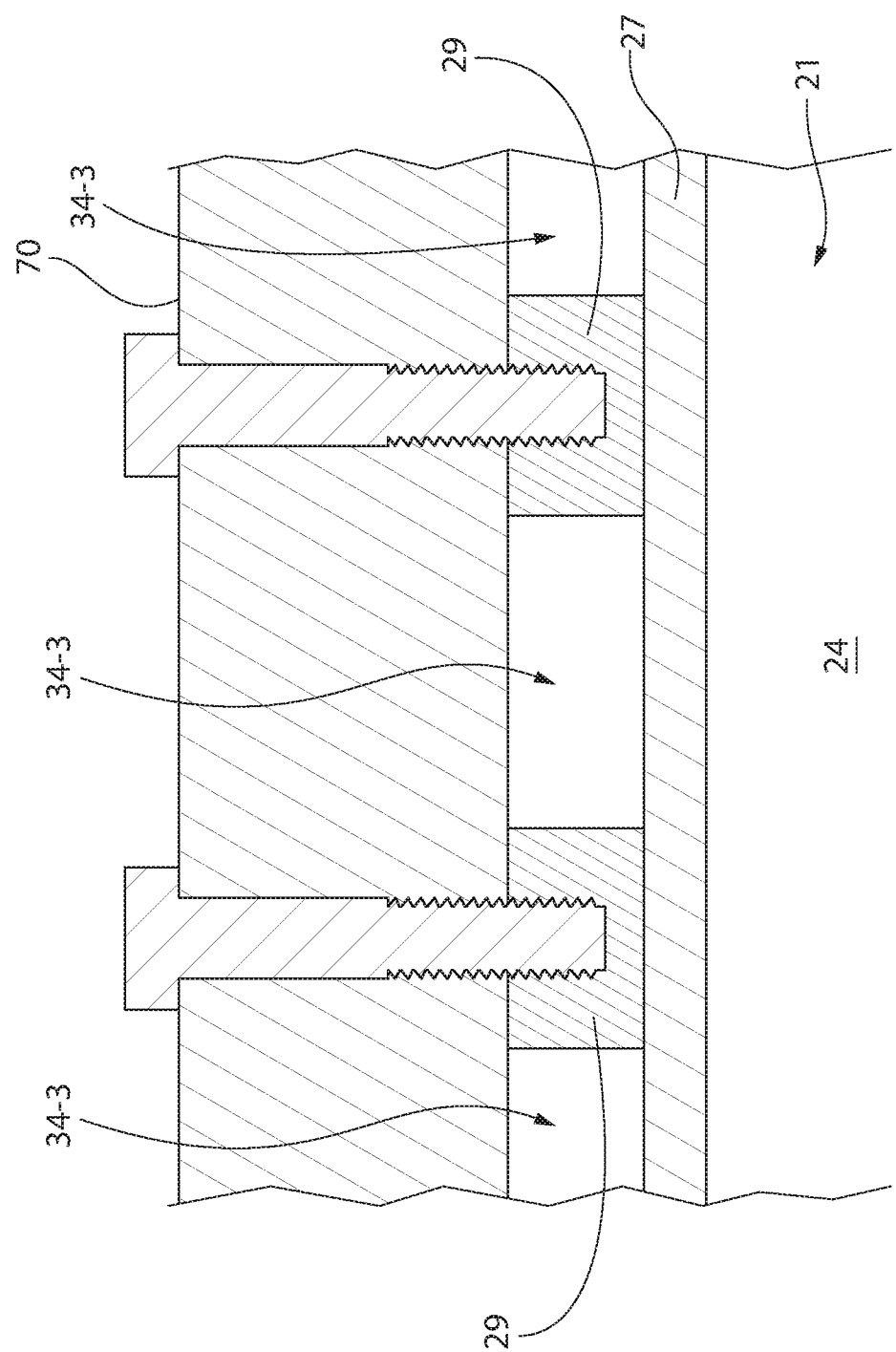
FIG. 11 is an enlarged side cross-sectional view showing a mechanism for coupling the mounting flanges of inner gamma block cylinder to the outer neutron shield cylinder.
Figure 12:
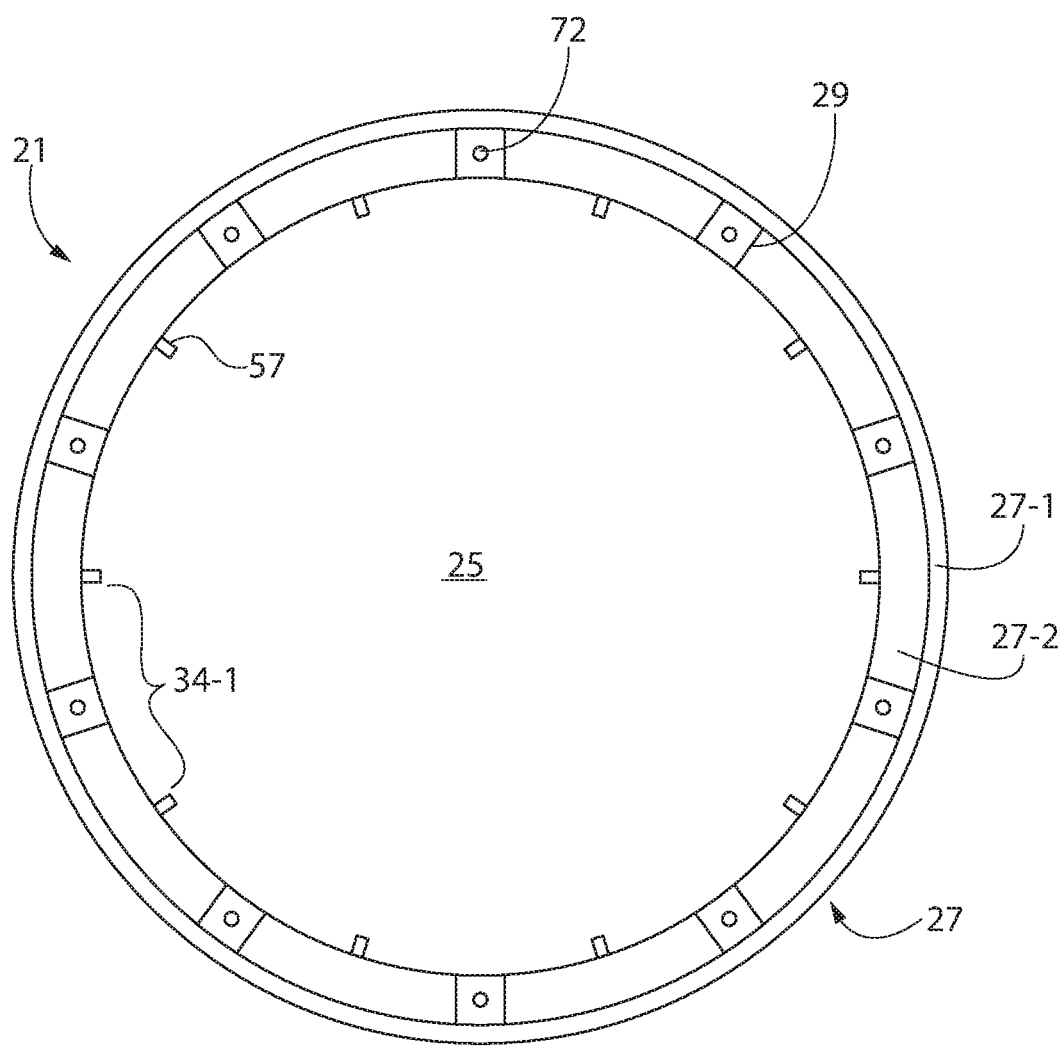
FIG. 12 is a top view of the neutron shield cylinder.
Figure 13:
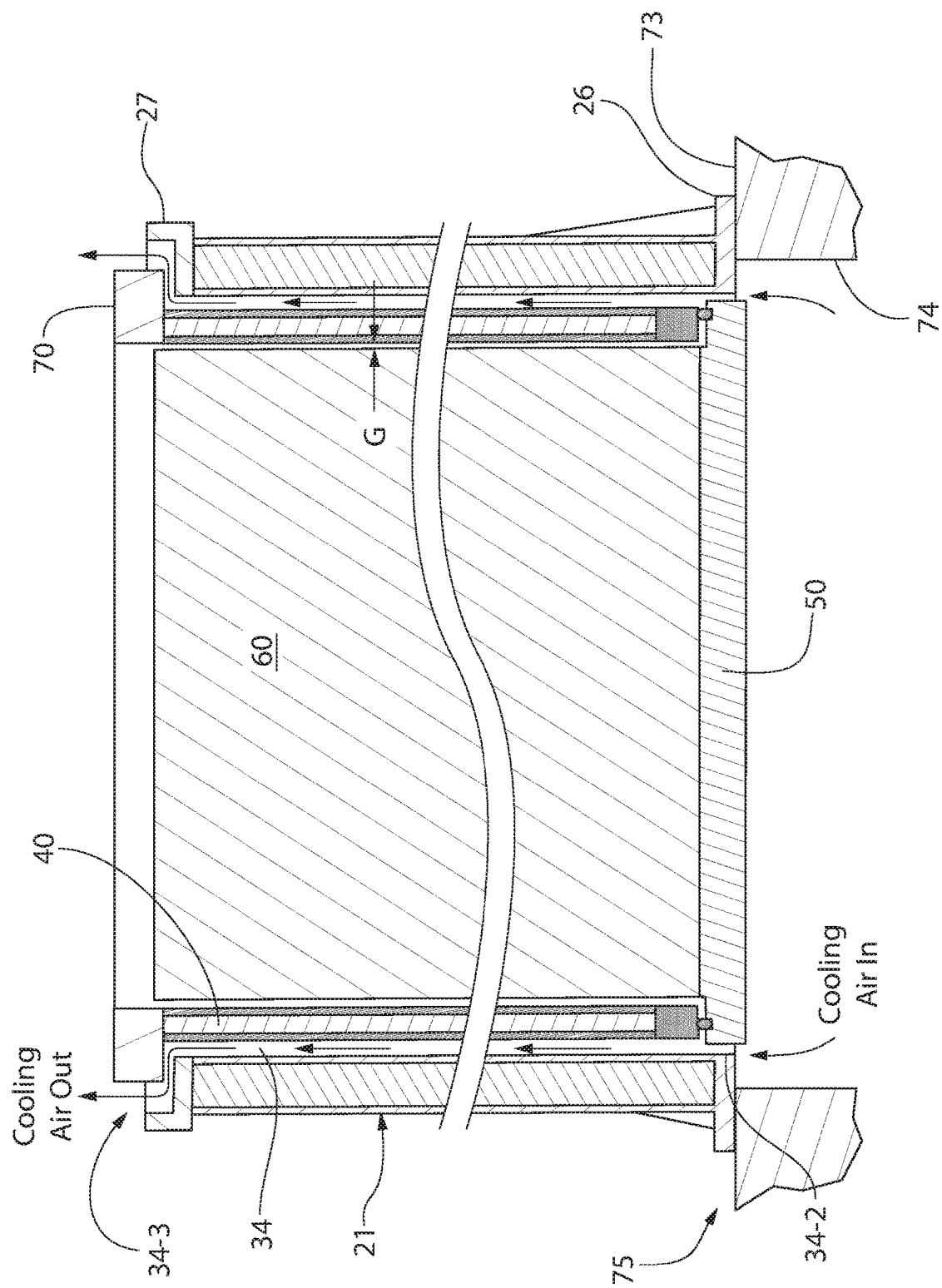
FIG. 13 is a cross-sectional side view showing the air ventilation system of the cask.

Lid 50 may be removably coupled to the bottom closure ring 51 of cylinder 40 by suitable fasteners selected to form an interlocked arrangement between the ring and lid. In one embodiment, as best seen in FIGS. 9 and 10, a plurality of locking keys 53 at circumferentially spaced intervals around the perimeter of cylinder 40 and lid 50 may be used to couple the lid to the closure ring 51. The keys 53 are inserted into complementary configured locking slots 54; a half-portion of the slots being formed in each of the adjoining bottom closure ring 51 and lid 50 which collectively define the shape of the locking slot. Slots 54 are laterally open and extend radially inwards into the cylinder 40 towards longitudinal axis LA for a suitable distance. The keys 53 may be polygonal shaped, and preferably rectilinear polygon shaped in one non-limiting embodiment. In one embodiment, the keys 53 and mating slots 54 may be I-shaped as shown. Other shaped keys including non-polygonal shapes however may be used so long as an interlocked arrangement is formed between the bottom closure ring 51 and lid 50 of the GBC. The shape of the key is not limiting of the invention.

To provide access to locking keys 53 when the inner gamma blocker cylinder 40 is inserted in the outer neutron shield cylinder 21, a plurality of radially extending and laterally open access slots 56 may be formed in the bottom flange 26 of the outer cylinder 21 (best shown in FIG. 9). Each key 53 has an associated access slot 56.

In other possible implementations, threaded fasteners 55 (represented in dashed lines in FIG. 8) such as bolts may be used to detachably couple the lid 50 to the bottom closure ring 51 of the GBC. The fasteners 55 may be inserted at a diagonal orientation relative to the closure ring and lid as shown. In one embodiment, the interface between the lid 50 and bottom closure ring 51 may be sealed by an annular gasket or seal 52 formed of a suitable resiliently compressible elastomeric material or rubber. The seal is selected and configured to seal the internal cavity 44 of the gamma blocker cylinder 40 which holds the nuclear waste fuel canister 60 in an air-tight and liquid-tight manner.

The bottom lid 50 preferably does not extend beyond the sidewall 43 of the gamma blocker cylinder 40 as best shown in FIG. 8. This provides unimpeded insertion of cylinder 40 into the outer neutron shield cylinder 21 and maintains clearances for formation of the cooling air ventilation annulus 34 between the inner and outer cylinders further described herein. To facilitate centering and insertion of the inner cylinder 40, a plurality of longitudinal guide ribs or splines 57 may be provided on the interior surface 30 of the outer cylinder 21 in cavity 25. Guide splines 57 are circumferentially spaced and vertically elongated extending longitudinally along the longitudinal axis LA for preferably a majority or more preferably substantially the entirety of the longitudinal length of the cavity 25. Splines 57 extend radially inwards into the cavity 25 a short distance beyond the inner diameter of the NSC top flange 27 which circumscribes the top opening of the outer neutron shield cylinder 21 to ensure engagement with and guidance of the inner cylinder 40 as it is lowered therein. The top ends of the splines 57 may be obliquely angled to facilitate centering and entry of the inner cylinder 40 into the outer cylinder cavity 25, and smoothly engage the peripheral edges of the bottom lid 50 of the inner cylinder if not perfectly aligned coaxially with the longitudinal axis LA of the cask when lowered into the outer cylinder by a crane. It bears noting that the guide splines 57 further serve an important function of maintaining a substantially uniform cooling air ventilation annulus 34 between the inner and outer cylinders 40, 21. The guide splines 57 may be permanently attached to the outer neutron shield cylinder 21 by welding in one embodiment.

Figure 6:
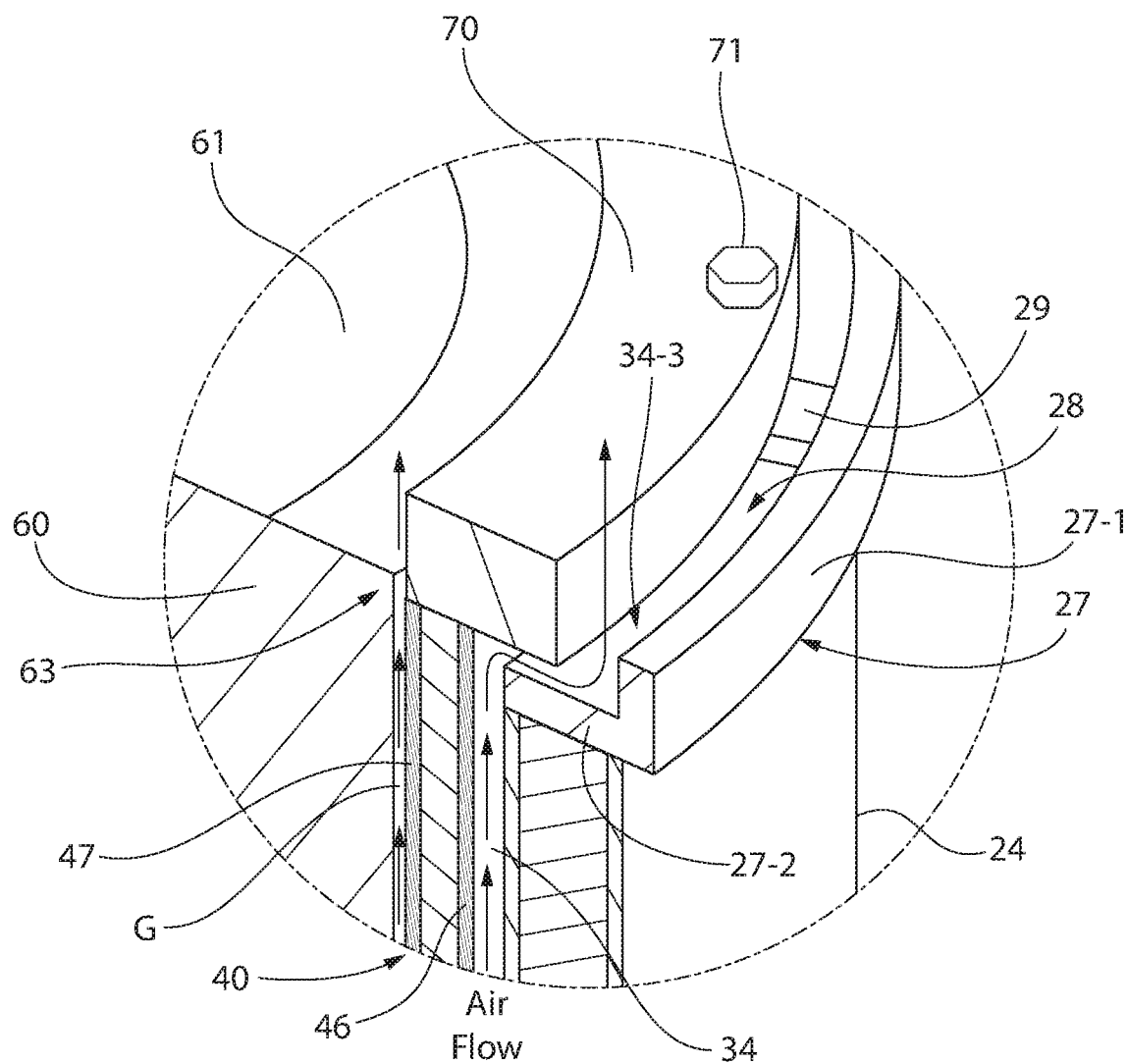
FIG. 6 is an enlarged top detail of the cask taken from FIG. 5 showing a mounting flange arrangement and cooling air flow paths designated by arrows.

With continuing reference generally to FIGS. 1-13, the top end 41 of the inner gamma block cylinder 40 may be terminated by an annular top mounting flange 70. Flange 70 projects radially/laterally outwards beyond the sidewall 43 of gamma blocker cylinder 40 (GBC) to engage the top flange 27 of the outer neutron shield cylinder 21 (NSC) as shown in FIGS. 5 and 6. The GBC mounting flange 41 is detachably mounted to the NSC top flange 27 by a plurality of mounting fasteners 71 such as threaded bolts in one non-limiting embodiment, thereby detachably coupling the inner and outer cylinders together (see also FIGS. 4 and 11). Fasteners 71 extend vertically completely through GBC mounting flange 70 and engage corresponding upwardly open threaded bores 72 formed in the NSC top flange 27. In one embodiment, the threaded bores 72 may be formed in spacer blocks 29 as best shown in FIG. 4. The spacer blocks 29 advantageously provide additional purchase or thickness of material to secure the mounting fasteners 71 to the NSC top flange 27 for structural strength.

When the inner gamma block cylinder 40 is mounted in the outer neutron shield cylinder 21, the entire weight of the inner cylinder 40 with loaded spent fuel canister 60 therein is fully supported by the outer cylinder 21 in a cantilevered manner via engagement between the mounting flange 70 and top flange 27. This allows the inner cylinder 40 directly heated by the heat emitting fuel canister 60 therein to thermally grow in length independently of the outer neutron shield cylinder 21 to avoid cracking caused by differential thermal expansion. The bottom support flange 26 of outer neutron shield cylinder 21 in turn is supported by the vertical cask transport crawler or vehicle 75 described elsewhere herein.

In one construction, the entire fully-loaded cask 20 including the outer neutron shield cylinder 21 and inner gamma block cylinder 40 with spent fuel canister 60 may be raised and lifted via the GBC mounting flange 70 and bolting alone. The flange 70 therefore has a sufficiently robust structure and thickness to support the entire cask weight. To lift the cask, at least one pair of lifting lug assemblies 76 shown in FIGS. 1-3 may be detachably mounted to the top of the mounting flange 70 via threaded lug fasteners 77 such as bolts. More lugs assemblies may be used in other embodiments depending on the desired rigging arrangement. In various embodiments, existing mounting fasteners 71 used to secure the mounting flange 70 to outer neutron shield cylinder 21 may be used as the lug fasteners. In other embodiments, separate threaded lug fasteners 77 may be used.

Figure 3:
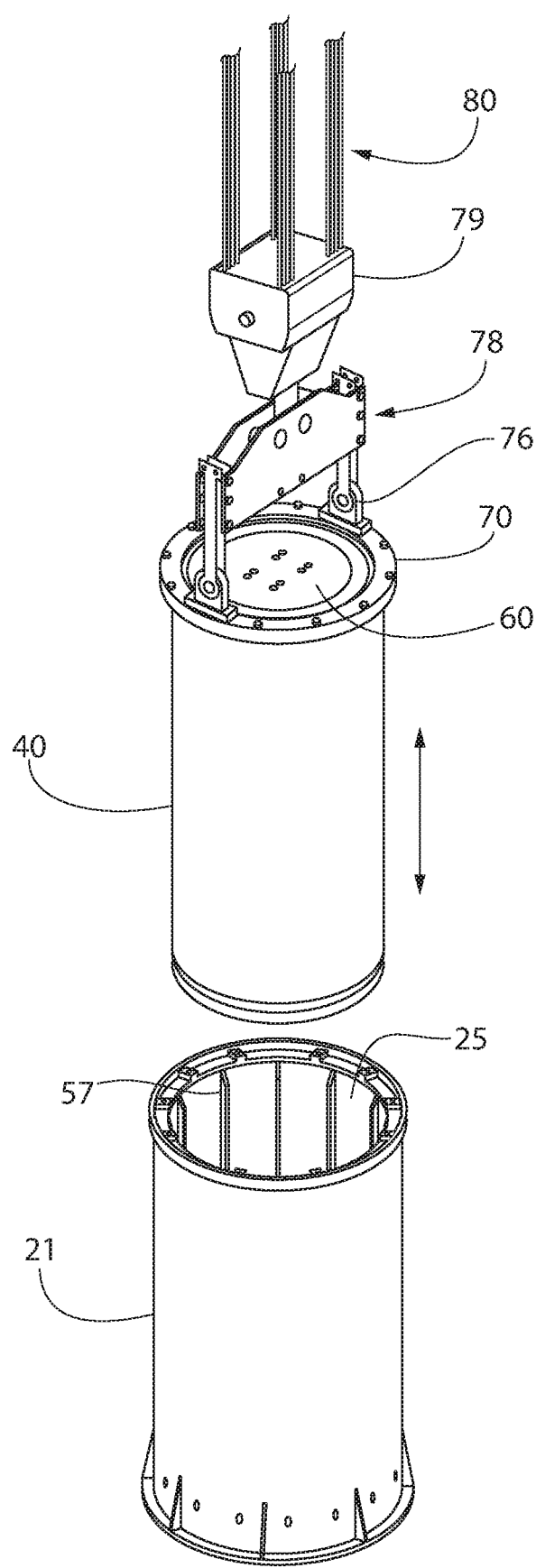
FIG. 3 is an exploded perspective view showing the inner gamma block cylinder uncoupled and separated from the outer neutron shield cylinder.

FIG. 3 shows inner gamma block cylinder 40 in the process of being raised or lowered via the hoist 79 of a crane 80 to remove or insert cylinder 40 into outer neutron shield cylinder 21. A lifting harness 78 is coupled to the hoist above and to the lifting lug assemblies 76 below mounted to the gamma block cylinder. When the inner gamma block cylinder 40 is mounted to the outer neutron shield cylinder 21 via mounting fasteners 71 as noted above, the entire cask 20 will be lifted or lowered in the same manner shown. It bears noting that the crane 80 shown may be one inside the reactor containment structure with access to the nuclear spent fuel pool, or the one mounted on the vertical cask transporter vehicle 75 (see, e.g. FIG. 14).

The inner gamma block cylinder 40 which holds the spent fuel canister 60 is heated by decay heat emanating from the spent nuclear fuel, which can be significant for a fairly long period of time. Provisions must therefore be made to effectively remove the decay heat to maintain the structural integrity of the cask components and its nuclear fuel contents.

According to one aspect of the invention, a cooling air system is provided which utilizes available ambient cooling air and natural flow circulation created via the chimney effect which is induced by the heat emitted by the decaying nuclear fuel assemblies via the inner gamma block cylinder 21 vertical sidewall 43. Referring to FIGS. 5-8, 11, and 13, an open vertically-extending cooling air ventilation annulus 34 is provided by a space or gap between the exterior surface 46 of vertical sidewall 43 of the inner gamma block cylinder 40 and the interior surface 30 of the vertical sidewall 24 of the outer neutron shield cylinder 21. Cooling air ventilation annulus 34 extends for the full height of the cask 20 and circumferentially around the entire interface between the inner and outer cylinders 40, 21. As previously described herein, the air ventilation annulus 34 may have a substantially uniform transverse cross-sectional area created by the longitudinal splines 57 affixed to the interior surface of the outer neutron shield cylinder 21 (see also FIGS. 4 and 12). Air flows vertically upwards through the cooling air ventilation annulus 34 between the splines 57 which create a plurality of longitudinally-extending air passages 34-1 defined by the splines.

Because the inner gamma block cylinder 40 is fully supported inside the outer neutron shield cylinder 21 from the top via engagement between the GBC mounting flange 70 and the NSC top flange 27, this allows the air ventilation annulus to extend completely through the bottom end of cask. This forms an annular lower cooling air inlet opening 34-2 into the air ventilation annulus 34 between the cylinders at the bottom of the cask (best shown in FIGS. 7-8). Air inlet opening 34-2 may be continuously open and uninterrupted for a full 360 degrees in some embodiments.

Seating the top mounting flange 70 of the gamma block cylinder 40 on the spacer blocks 29 of the neutron shield cylinder top flange 27 in the manner previously described herein further forms a plurality of upper cooling air outlet openings 34-3 between the vertically spaced apart mating flanges which are in fluid communication with the air ventilation annulus 34 between the gamma block cylinder 40 and neutron shield cylinder 21. The vertically protruding raised annular lip 27-1 of the neutron shield cylinder top flange 27 and angled cross-sectional shape of the flange creates a circuitous air L-shaped outlet path which advantageously prevents direct streaming of neutrons to the external environment through the upper air outlet openings 34-3. This there is no direct line of sight from outside through the air outlet openings 34-3 into the interior portions of the cask 20 to prevent neutron streaming.

In operation of the cooling air system, ambient cooling air enters the annular lower air inlet opening 34-2 vertically and flows vertically into and upwards through the air ventilation annulus 34 to the top of the cask 20 (parallel to longitudinal axis LA). The air in the open annulus 34 is directly heated by the inner gamma block cylinder sidewall 43. This draws the air inwards into the cask 20 via the lower air inlet opening 34-2 by natural convention. The heated cooling air then flows upwards in the air ventilation annulus, flows radially/laterally through the upper air outlet openings 34-3 (perpendicular to longitudinal axis LA), then turns vertically upwards flowing past the annular lip 27-1 of the outer NSC cylinder 21 and is discharged to the ambient atmosphere and environment.

Referring to FIGS. 7 and 8, a circumferentially-extending radial annular space or gap G may preferably also be provided at the interface between the fuel canister 60 and the interior surface 45 of the gamma block cylinder 40. For optimal thermal and ALARA performance, the ability to keep this annular gap G either filled with water (for additional shielding) or air ventilated (for additional heat rejection capacity) is desirable during different stages the fuel loading scenario. The bottom lid 50 of the gamma block cylinder 40 may include a plurality of air inlet holes 62 configured to provide a passage for introducing ambient cooling ventilation upwards into annular gap G (see, e.g. FIGS. 7 and 9). Although air inlet holes 62 are formed in the lateral sides of the portion of the lid 50 which extend beneath the bottom support flange 26 of the neutron shield cylinder 21. Air inlet holes 62 may have an L-shape configuration, the holes may in other embodiments be vertically straight and drilled directly through the underside of the lid 50 and extend upwards to fluidly coupled to annular gap G.

The air inlet holes 62 in the bottom lid are designed to be readily plugged, if needed, to keep the annular gap G instead filled with water if needed during certain phases of the cask fuel loading and handling operations. Thus, the drainable annular gap G surrounding the canister can be used to promote air ventilation or to keep filled with water, as needed, during the fuel loading and transfer operations. The annular gap G is upwardly open at the interface between the gamma block cylinder 40 and canister 60 forming an annular air outlet 63 (best shown in FIG. 6). Water can be introduced into the annular gap G via the air outlet 63 to cool the canister 60 if needed for additional neutron shielding instead of air cooling, as previously described above. If the canister 60 requires further active cooling to dissipate heat generated by the decaying nuclear fuel, the drainable annulus (gap G) advantageously provides the facility to spray water on the canister lid using gravity fed water drip to efficiently remove heat from the canister without resorting to an active cooling system.

The physically detachable outer neutron shield cylinder 21 (NSC) separable at strategic times from the inner gamma block cylinder 40 (GBC) as previously described herein offers several advantages.

One advantage is that by separating the thermally low conductivity part of transfer cask (i.e., NSC) from the thermally high conductive GBC, it is now possible to incorporate an air ventilation annulus 34 previously described herein between them. The hot external surface of the GBC, heated by the decay heat from fuel in the canister inside the GBC, drives an efficient natural convection air ventilation action to keep fuel from heating excessively.

Another advantage is that in some cases (e.g., during the canister drying operation), it may desirable to keep the cask as hot as possible. In such a case, having the high thermal inertia neutron shield of the NSC separated from the GBC of the cask body or the ability to physically block the air ventilation is helpful in accelerating the drying operation.

Another advantage is that the permissible weight of most transfer casks is limited by the rated lift capacity of the cask handling crane or the size of the cask loading area in the spent fuel pool. Under the present separable GBC and NSC approach, the GBC is made as heavy and as large in diameter as possible within the constraints of the plant's architecture and crane capacity. The NSC is likewise made as large as possible within the constraints of the load lifting device used to handle the transfer cask typically having a higher rated load lifting capacity than the cask handling crane in the nuclear facility cask loading area. These two features combine in a way to optimize the transfer cask's shielding performance.

Yet another advantage is that the NSC may be made in the form of a single or multiple section annular cylinder containing water or a solid resinous neutron shielding material therein, such as Holtite™, contained in a steel exterior. Boric acid may be added to the water mass of the NSC for enhanced neutron capture.

Figure 14:
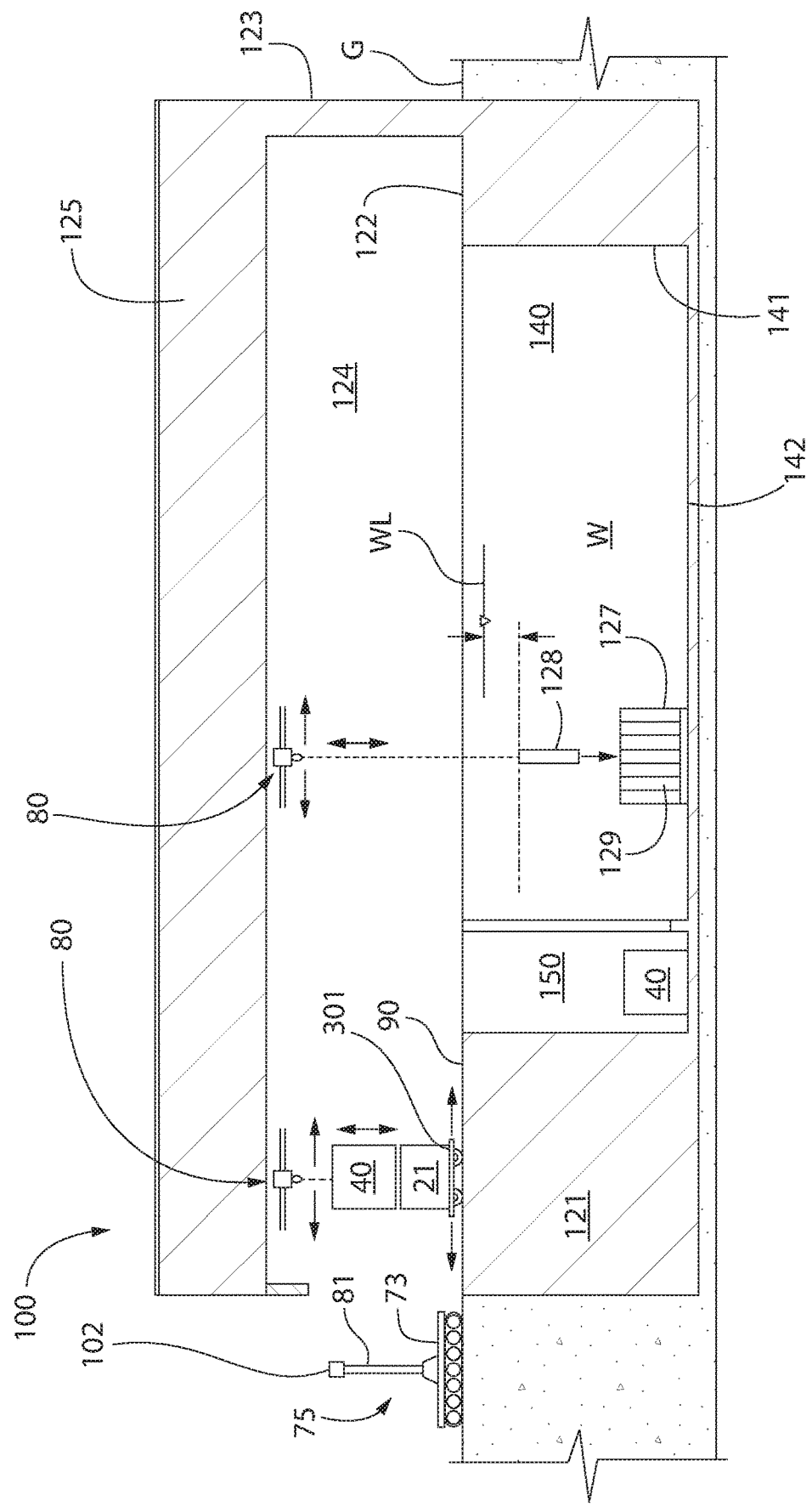
FIG. 14 is a schematic diagonal showing a nuclear fuel storage and loading facility utilizing the cask system of FIG. 1.

FIG. 14 is a schematic diagram of an example of a "wet" spent nuclear storage facility 100 for temporary holding of spent nuclear fuel—not to be confused with a "dry" independent spent fuel storage installation (ISFSI) for the longer interim storage of spent nuclear fuel. Wet storage facility 100 includes a structural building enclosure with roof 125, walls 123, and a steel reinforced concrete base mat 121 that defines a substantially horizontal operating deck 122 surrounding and extending over portions of a spent fuel pool 140 impounded with water W. Deck 122 may be at surrounding ground level or grade G to facilitate movement of motorized cask vehicles or carts into and out of the facility. An access bay 90 is defined by deck 122 adjacent to the fuel pool 140 for staging the present fuel transport cask 20 comprises of the outer neutron shield cylinder 21 and inner gamma block cylinder 40 as shown. In some embodiments, the building enclosure may be a reactor containment enclosure structure.

Fuel pool 140 includes a base or floor 142 and plural vertical sidewalls 141 extending upwards therefrom to the operating deck 122. A water level WL is formed in the pool. Submerged in the pool 140 is a fuel storage rack 127 comprising a plurality of upwardly open storage cells 129 each configured to hold a single used or spent nuclear fuel assembly 128 removed from the reactor. The fuel assembles themselves comprise a plurality of fuel rods and upper and lower flow nozzles for primary coolant flow in the reactor; the design of the fuel assembly being well known to those skilled in the art without undue elaboration herein. A portion of the fuel pool 140 defines a cask loading area 150 for loading fuel assemblies from rack 127 into the canister 60 located inside the gamma block cylinder 40 as further described below. For the fuel assembly to canister loading operation and manipulating the transfer cask 20 components (GBC, NSC) and fuel canister, one or more overhead trolley cranes 80 previously described herein may be provided which are operable to lift a load and traverse the wet storage facility 100.

A process or method for transferring and transporting spent nuclear fuel will now be briefly summarized with initial reference to FIG. 14. The first step is providing a nuclear fuel transport cask 20 comprising an outer neutron shield cylinder 21 having an internal first cavity 25 and an inner gamma block cylinder 40 having an internal second cavity 44. Initially, the gamma block cylinder is detachably coupled to and nested inside the first cavity of the neutron shield cylinder at the start of the process describe below. The cask 20 may be transported to the dry spent fuel storage facility 100 via the self-propelled wheeled or tracked crawler 75 having an overhead high lifting capacity crane 102 mounted high above platform 73 of the crawler by a pair of vertical columns 81 with the crane supported by a beam between the columns. Such cask transporters are well known in the art.

The cask 20 may be moved via the heavy duty crawler 75 (e.g. about 170 ton lifting capacity) to a staging spot immediately outside the fuel storage facility 100 as shown. The tall height and weight of the crawler generally precludes it from entering the fuel storage facility. In one scenario, the entire cask 20 may be placed on a low profile wheeled cask transport cart 301 which typically move along a pair of continuous rails supported at ground level G outside the facility and the operating deck 122 inside the facility. The cask 20 is then moved inside the facility enclosure to the access bay 90 alongside the fuel pool 140. The next step in the process is separating the gamma block cylinder 40 from the outer neutron shield cylinder 21 using inside crane 80 as shown in FIG. 14. This is accomplished by first unbolting the mounting flange 70 of the gamma block cylinder 40 from the top flange 27 of the outer neutron shield cylinder 21. The gamma block cylinder 40 is then lifted/raised with the crane 80 and separated from neutron shield cylinder 21 via the lifting harness 78 and lifting lugs 78 attached to the top mounting flange 70 of the gamma block cylinder. An available empty fuel canister 60 may then be lifted by crane 80 and inserted vertically downwards into the gamma block cylinder 40 either outside of or in the fuel pool 140 (if not already placed therein previously). Alternatively, the canister may be placed inside the gamma block cylinder 40 before separation from the neutron shield cylinder 21.

In an alternate possible but less preferred scenario, the gamma block cylinder 40 may be uncoupled and removed from the neutron shield cylinder 21 outside the fuel storage facility 100 by the crawler crane 102. The gamma block cylinder may then be moved alone on the cask transport cart 301 and moved into the facility.

Next, the inside overhead crane 80 then lifts/raises the gamma block cylinder 40 and canister 60 assembly (assuming the canister is inserted in cylinder 40 outside the fuel pool 140), and places/lowers the assembly into the fuel pool 140 onto a support surface (e.g. fuel pool floor 142) in the cask loading area 150 of the pool. Water fills both the gamma block cylinder and canister (which has its lid 61 removed). The gamma block cylinder and canister 60 are submerged under water W to a depth sufficient to keep the fuel assembles 128 beneath the water level WL when loaded into the canister by crane 80. The fuel assemblies are then loaded into the canister and gamma block cylinder one at a time.

After loaded with fuel assemblies, the next step is using crane 80 to lift/raise the loaded gamma block cylinder 40 and fuel canister 60 assembly out of the fuel pool 140. The gamma block cylinder 40 and fuel canister 60 assembly is maneuvered over top of the neutron shield cylinder 21 on the cart 301, and then lowered/inserted into the neutron shield cylinder. Because the neutron shield cylinder 21 is now in place for neutron radiation shielding, the canister may be optionally dewatered at this time. The next step is bolting the inner gamma block cylinder 40 to the outer neutron shield cylinder 21 via the mating mounting and top flanges 70, 26 of each vessel, respectively. The cart 301 with now fully re-assembled cask 20 is then moved back out of the facility. Using the crawler crane 102, the next step is lifting the cask 20 back onto the crawler 75 for further closure operations and transport to the dry storage facility.

It bears noting that at the time of the gamma block cylinder 40 and canister 60 removal from the spent fuel pool 140, the water in the canister provides the necessary neutron shielding (the gamma block cylinder providing the gamma radiation shielding). The lift weight of gamma block cylinder and water filled canister (without the neutron shield cylinder 21) is within the allowable facility crane 80 lifting capacity. Once the gamma block cylinder 40 with water-laden canister 60 are inserted into the outer re-coupled neutron shield cylinder 21, the transfer cask 20 has the requisite neutron shielding to commence with the canister dewatering, closure, and transfer operations. The neutron shield cylinder 21 is thus preferably installed prior to the dewatering of the canister 60 to assure no lapse in neutron shielding. Prior to lifting the entire fully assembled transfer cask 20, now consisting of the gamma block cylinder 40, neutron shield cylinder 21, and canister 60, the now dewatered canister reduces the casks overall/cumulative lift weight to within the capacity of the crawler 75 crane (or other lifting device).

Variations in the foregoing sequence of steps may be used in practice in other embodiments and does not limit the invention.

While the foregoing description and drawings represent some example systems, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. A separable multi-component cask for spent nuclear fuel transport and storage comprising:
   a vertical longitudinal axis;
   a vertically elongated first cylinder having a neutron radiation shielding composition, the first cylinder defining a first cavity extending along the longitudinal axis;
   a vertically elongated second cylinder having a gamma radiation blocking composition, the second cylinder defining a second cavity extending along the longitudinal axis and configured to hold a cylindrical spent nuclear fuel canister containing a plurality of fuel assemblies;

the second cylinder detachably mounted inside the first cavity of the first cylinder; and an air ventilation annulus formed between the first and second cylinders, the air ventilation annulus defining a heat removal passage to remove heat emitted by the canister when placed inside the second cylinder.

2. The cask according to claim 1, wherein the second cylinder has a higher thermal conductivity than the first second cylinder.

3. The cask according to claim 1, wherein the second cylinder includes a bottom lid attached to a bottom end of the second cylinder, and a radially protruding top mounting flange extending circumferentially around a top end of the second cylinder.

4. The cask according to claim 3, wherein the top mounting flange is received at east partially with an upwardly open annular recess formed in a top end of the first cylinder.

5. The cask according to claim 4, wherein the annular recess is formed by an angle ring having an L-shaped cross section.

6. The cask according to claim 4, wherein the annular recess comprises a plurality of raised spacer blocks, the top mounting flange of the second cylinder being seated on the spacer blocks to form a plurality of upper air outlet openings between the top flange and the first cylinder within the recess which is in fluid communication with the air ventilation annulus between the first and second cylinders.

7. The cask according to claim 6, wherein the top mounting flange is coupled directly to the spacer blocks by threaded fasteners.

8. The cask according to claim 3, wherein the first cylinder includes a castellated top end, the top mounting flange of the second cylinder being supported on the castellated top end forming a plurality of upper air openings in fluid communication with the air ventilation annulus.

9. The cask according to claim 3, wherein the bottom lid is comprised of a gamma blocking material and a neutron absorbing material.

10. The cask according to claim 9, wherein the bottom lid comprises a hydrogenous material.

11. The cask according to claim 1, further comprising a bottom lid attached to a bottom end of the second cylinder, wherein the bottom lid extends downwards below an annular support flange at a bottom end of the first cylinder forming a lower air inlet to the air ventilation annulus.

12. The cask according to claim 1, further comprising a bottom lid attached to a bottom end of the second cylinder, wherein the bottom lid does not protrude radially outwards between a sidewall of the second cylinder.

13. The cask according to claim 12, wherein an interior surface of the first shell includes a plurality of vertical longitudinal splines arranged in the air ventilation annulus which center the second cylinder in the first cylinder, a plurality of longitudinally-extending air passages of the air ventilation annulus being formed between the splines.

14. The cask according to claim 3, further comprising a plurality of lifting lugs detachably mounted to the top mounting flange of the second cylinder for lifting and moving the second cylinder.

15. The cask according to claim 14, wherein the top mounting flange of the second cylinder is coupled to the first cylinder by a plurality of threaded fasteners engaging a top flange of the first cylinder, the first and second cylinders being liftable as a unit by lifting the second shell via the lifting lugs.

16. The cask according to claim 1, wherein the first and second cylinders each have a cylindrical body with circular transverse cross-sectional shape.

17. A multi-component transfer cask system for storage and transport of spent nuclear fuel comprising:
a vertical longitudinal axis;
a vertically elongated outer container having a neutron radiation shielding composition, the outer container comprising a top end including an annular top flange, a bottom end, and a cylindrical sidewall extending between the ends and defining a first cavity;
a vertically elongated inner container having a gamma radiation blocking composition, the inner container comprising a top end including an annular mounting flange, a bottom end, and a sidewall extending between the ends and defining a second cavity configured to hold a spent nuclear fuel canister;
the mounting flange of the inner container detachably coupled to the top flange of the outer the outer container such that the inner container is suspended and supported via the coupled flanges in a cantilevered manner;
a spent nuclear fuel canister disposed in the second cavity of the inner container and heating the inner container;
an air ventilation annulus formed between the inner and outer containers along the longitudinal axis, wherein air within the annulus is heated by the inner shell inducing an upward flow of cooling air through the annulus;
an interface between the mounting flange of the inner container and the top flange of outer container being configured to define a plurality of upper cooling air outlet openings in fluid communication with the air ventilation annulus for rejecting the heated air to an ambient environment;
wherein the inner container is axially and slideably separable from the outer container.

18. The cask according to claim 17, wherein the top flange of the outer container is castellated forming a plurality of circumferentially spaced apart vertical gaps between top flange and the mounting flange of the inner container which define the upper cooling air outlet openings.

19. The cask according to claim 17, further comprising a bottom lid attached to the bottom end of the inner shell, wherein the bottom lid extends downwards below the bottom end of the outer shell and defines a downwardly open annular lower cooling air inlet opening between the inner and outer containers to introduce ambient cooling air into the air ventilation annulus.

20. The cask according to claim 17, wherein the mounting flange of the inner container is coupled to the top flange of the outer container by a plurality of threaded fasteners.

21. A method for transferring and transporting spent nuclear fuel comprising:
providing a nuclear fuel transport cask comprising an outer neutron shield cylinder having an internal first cavity and an inner gamma block cylinder having an internal second cavity, the gamma block cylinder detachably coupled to and nested inside the first cavity of the neutron shield cylinder;
separating the gamma block cylinder from the neutron shield cylinder;
placing the gamma block cylinder on a support surface;
loading a plurality of spent nuclear fuel assembles into the second cavity of the gamma block cylinder;

lifting the gamma block cylinder over the neutron shield cylinder; and inserting the gamma block cylinder and fuel canister assembly into the neutron shield cylinder; and seating a top mounting flange of the gamma block cylinder on a plurality of spacer blocks arranged circumferentially around the neutron shield cylinder.

22. The method according to claim 21, further comprising before or after the step of placing the gamma block cylinder, a step of inserting a fuel canister into the gamma block cylinder before the loading step, wherein the fuel assembly are loaded into the canister.

23. The method according to claim 21, further comprising after the step of inserting the gamma block cylinder into the neutron shield cylinder, bolting a top mounting flange of the gamma block cylinder to a top flange of the neutron shield cylinder.

* * * * *